US007472409B1

(12) United States Patent
Linton

(10) Patent No.: US 7,472,409 B1
(45) Date of Patent: Dec. 30, 2008

(54) SYSTEM FOR ACCESS TO DIRECT BROADCAST SATELLITE SERVICES

(75) Inventor: Jeb R. Linton, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 1280 days.

(21) Appl. No.: 09/679,590

(22) Filed: Oct. 4, 2000

Related U.S. Application Data

(60) Provisional application No. 60/192,494, filed on Mar. 28, 2000.

(51) Int. Cl.
*H04Q 7/36* (2006.01)
*H04Q 7/06* (2006.01)
*H01Q 3/00* (2006.01)

(52) U.S. Cl. .......................... 725/76; 725/75; 725/118; 342/354; 342/359; 342/360; 343/705; 343/711; 343/714; 343/882

(58) Field of Classification Search ............ 725/63–72, 725/75–76, 54, 73, 117, 118; 343/705, 711, 343/714, 824, 842, 866, 869, 872, 888; 342/354, 342/359–360, 368
See application file for complete search history.

(56) References Cited

U.S. PATENT DOCUMENTS

| | | | | | |
|---|---|---|---|---|---|
| 4,779,097 | A | * | 10/1988 | Morchin | 342/368 |
| 5,017,931 | A | | 5/1991 | Carlyon | 33/700 |
| 5,311,197 | A | | 5/1994 | Sorden et al. | |
| 5,357,259 | A | * | 10/1994 | Nosal | 342/398 |
| 5,373,857 | A | * | 12/1994 | Travers et al. | 600/595 |
| 5,463,656 | A | | 10/1995 | Polivka et al. | |
| 5,526,022 | A | * | 6/1996 | Donahue et al. | 345/156 |
| 5,537,122 | A | * | 7/1996 | Eguchi | 342/359 |
| 5,584,047 | A | | 12/1996 | Tuck | 455/13.1 |
| 5,610,822 | A | * | 3/1997 | Murphy | 701/211 |
| 5,678,171 | A | * | 10/1997 | Toyama et al. | 725/76 |
| 5,760,819 | A | | 6/1998 | Sklar et al. | 348/8 |
| 5,764,185 | A | * | 6/1998 | Fukushima et al. | 342/359 |
| 5,790,175 | A | | 8/1998 | Sklar et al. | 348/8 |
| 5,835,057 | A | | 11/1998 | Van Heyningen | |
| 5,886,671 | A | | 3/1999 | Riemer et al. | 343/776 |
| 5,915,020 | A | | 6/1999 | Tilford et al. | 380/10 |
| 5,929,808 | A | | 7/1999 | Hassan et al. | 342/368 |
| 5,929,819 | A | | 7/1999 | Grinberg | |
| 5,929,895 | A | | 7/1999 | Berry et al. | 348/8 |
| 5,973,647 | A | | 10/1999 | Barrett et al. | |
| 5,982,334 | A | | 11/1999 | Manasson et al. | 343/785 |
| 5,983,071 | A | | 11/1999 | Gagnon et al. | |
| 5,990,928 | A | * | 11/1999 | Sklar et al. | 725/72 |
| 5,999,130 | A | | 12/1999 | Snow et al. | |
| 6,016,120 | A | | 1/2000 | McNabb et al. | |

(Continued)

*Primary Examiner*—Christopher Kelley
*Assistant Examiner*—Reuben M Brown
(74) *Attorney, Agent, or Firm*—Marsh Fischmann & Breyfogle LLP

(57) ABSTRACT

A system for receiving direct broadcast satellite signals in a mobile craft is disclosed. Generally, the system includes an orientation system for determining the first orientation of the mobile craft, a controller or processor for determining first position control data, and an electronically-pointable antenna adapted to receive first position control data from the controller, such that the antenna is pointable in accordance therewith, such that a first direct broadcast satellite signal is receivable from a first direct broadcast satellite, and a direct broadcast satellite receiver for processing a first radio frequency signal corresponding to the first direct broadcast satellite signal received by the electronically-pointable antenna.

15 Claims, 3 Drawing Sheets

U.S. PATENT DOCUMENTS

| | | | | |
|---|---|---|---|---|
| 6,018,659 | A * | 1/2000 | Ayyagari et al. | 455/431 |
| 6,023,242 | A | 2/2000 | Dixon | |
| 6,026,088 | A | 2/2000 | Rostoker et al. | 370/395 |
| 6,029,044 | A | 2/2000 | Arsenault et al. | 455/3.2 |
| 6,037,908 | A | 3/2000 | Phillips et al. | 343/753 |
| 6,124,832 | A * | 9/2000 | Jeon et al. | 343/711 |
| 6,166,686 | A * | 12/2000 | Lazar | 342/357.14 |
| 6,184,825 | B1 * | 2/2001 | Wehner et al. | 342/359 |
| 6,191,734 | B1 * | 2/2001 | Park et al. | 342/359 |
| 6,667,715 | B1 * | 12/2003 | Chang et al. | 342/373 |

* cited by examiner

SYSTEM FOR ACCESS TO DIRECT BROADCAST SATELLITE SERVICES

RELATED APPLICATIONS

This application claims priority benefit to U.S. Provisional Application Ser. No. 60/192,494, filed on Mar. 28, 2000, the entirety of which is incorporated by reference herein.

FIELD OF THE INVENTION

The present invention generally relates to a system for receiving a direct broadcast satellite signal from a direct broadcast satellite, and in particular, to a system for receiving direct broadcast satellite transmission in a mobile craft.

BACKGROUND OF THE INVENTION

In recent years, direct broadcast satellite systems have come into widespread use throughout the world for reception of digital television in the home, as a replacement for traditional wired cable television services. Direct broadcast satellite systems have also been used for high-speed Internet access, which is especially useful in areas where such access is otherwise unavailable. Direct broadcast satellite services have also been utilized in large recreational vehicles, airliners, and ships, where large, gimbaled dish antennas under shielding domes are employed to receive direct broadcast satellite signals. Such gimbaled dishes are expensive, have a large profile and are only practical in large vehicle applications in which aerodynamics are of little concern (e.g., large recreational vehicle). In addition, these systems rely on sizable, fast-moving antenna components and motors that have relatively high power requirements and are that typically less reliable than systems with no moving components. Current phased array antennas utilized in direct broadcast satellite systems are extremely expensive, and still have a large enough physical profile to adversely affect the aerodynamics and aesthetic appearance. Such phased array antennas also have relatively low gain in relation to their large size.

Aside from size, power, and cost factors, mobile satellite reception of direct broadcast satellite signals pose several other unique challenges. These include continuous fine-tuning of the aperture, tracking during loss of signal due to obstacles (e.g., bridges, trees, etc.) or vehicle orientation (e.g., steep banking turns in small aircraft), and reliability of electronics, especially in view of poorly damped physical turbulence.

SUMMARY OF THE INVENTION

Accordingly, it is an object of the present invention to provide a compact, low-cost direct broadcast satellite system for use in a mobile craft (e.g., automobiles, vans, trucks, aircraft, boats, etc.).

It is another object of the present invention to provide a direct broadcast satellite system for receiving television and/or data signals in a mobile craft.

It is a further object of the present invention to provide a system adapted to receive direct broadcast satellite signals in a mobile craft, using compact and inexpensive components.

The system of the present invention achieves one or more of these objectives by providing a system for receiving broadcast satellite transmissions. Generally, the system may include an orientation system for determining at least a first orientation of the vehicle or mobile craft, in three dimensions, a controller or processor in communication with the orientation system to determine first position control data, and an electronically-pointable antenna adapted to receive the first position control data from the controller to point in accordance therewith, such that a first direct broadcast satellite signal is receivable from a first direct broadcast satellite, and a direct broadcast satellite receiver adapted to process a first radio frequency signal corresponding to a first direct broadcast satellite signal received by the electronically-pointable antenna. The electronically-pointable antenna may be a one-dimensionally electronically-pointable antenna, and, in order to provide two-dimensional pointing, the one-dimensionally electronically-pointable antenna may be mountable upon a turntable system. Alternatively, the electronically-pointable antenna may be two-dimensionally electronically-pointable. Such electronically-pointable antenna systems are compact and inexpensive, and thus facilitate incorporation into various mobile craft.

The orientation system may include a solid-state electromagnetic field sensor and a fluid-filled tilt-sensor to establish absolute orientation of the system or vehicle in which the system is installed. Such orientation information, in three dimensions, may be communicated to the controller or processor to determine first position control data. Location data, for instance from a Global Positioning System receiver may also be used by the controller or processor to determine the first position control data. Such first position control data may include a first look-angle, which is based upon the current location and orientation of the vehicle and position of the selected direct broadcast satellite, the first look-angle being communicable to the antenna to facilitate reception thereby of a first direct broadcast satellite signal.

The system may be an open-loop system, whereby GPS location information is received by a GPS receiver, orientation data is determined by the orientation system, and an input is receivable by a user regarding the desired direct broadcast satellite. Such data may be utilized by the controller or processor to compute a look-angle relative to the vehicle. Position control data, based upon the computed look-angle, are communicated to the electrically-pointable antenna during the absence of signal lock, as determined by the state of a signal lock detector component, or in the absence of a signal lock detector, at all times. The system may include a closed-looped feedback-based system, whereby the electronically-pointable antenna is continuously adjustable in one or two dimensions, and operates by receiving differential position outputs of the electronically-pointable antenna, determining adjustments to the optimal position of the antenna, and sending the adjusted position to the antenna to revise the position control data for the antenna if signal lock is present, as determined by the state of the signal lock detector.

DETAILED DESCRIPTION

Figure 1:
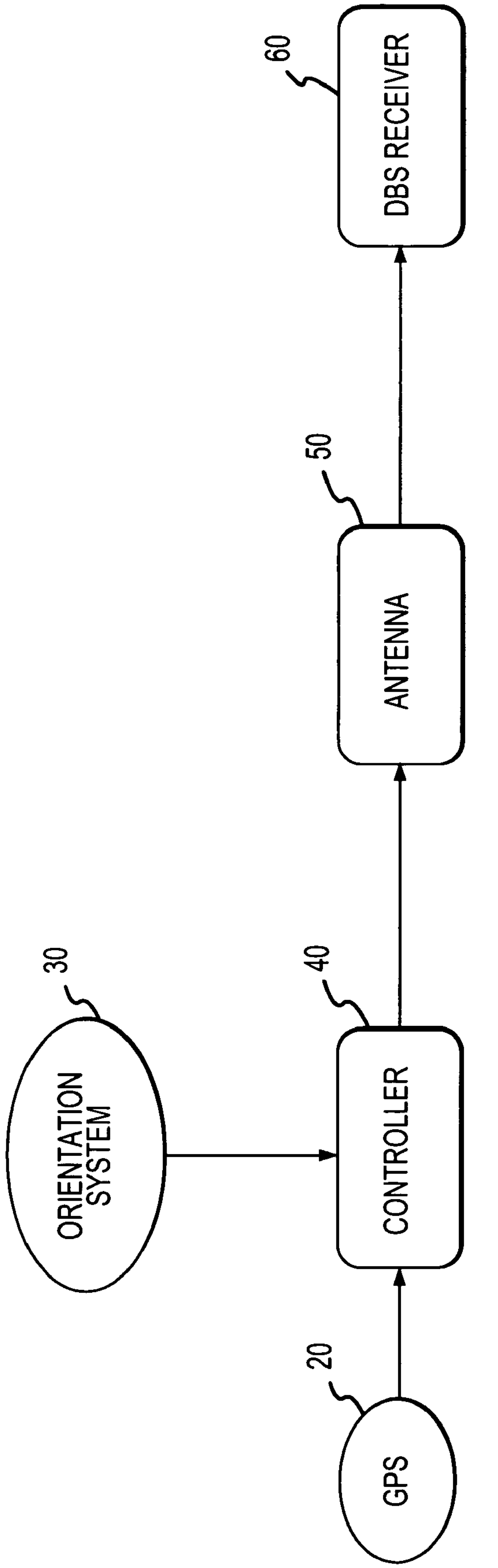
FIG. 1 is a block diagram of one embodiment of the system of the present invention.
Figure 2:
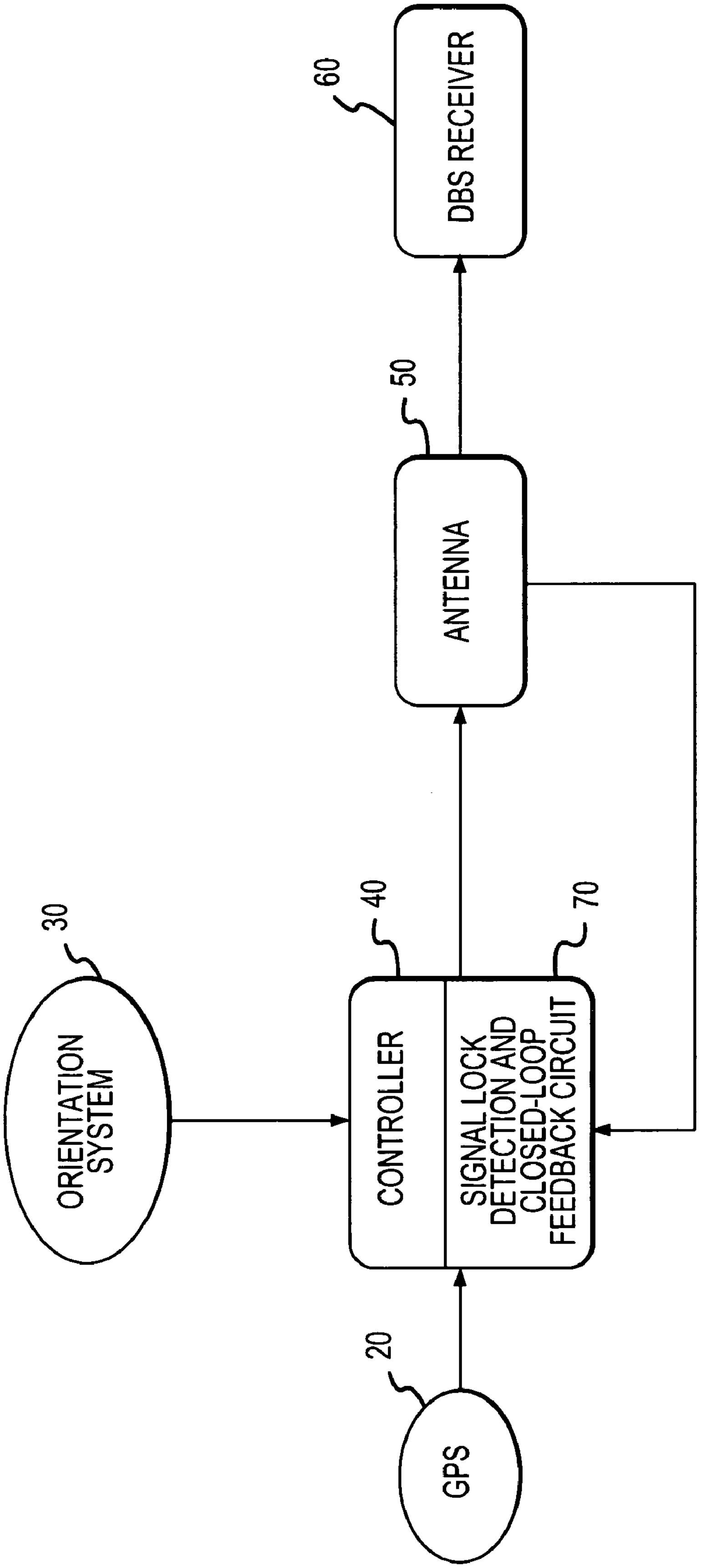
FIG. 2 is a schematic diagram of another embodiment of the system of the present invention.
Figure 3:
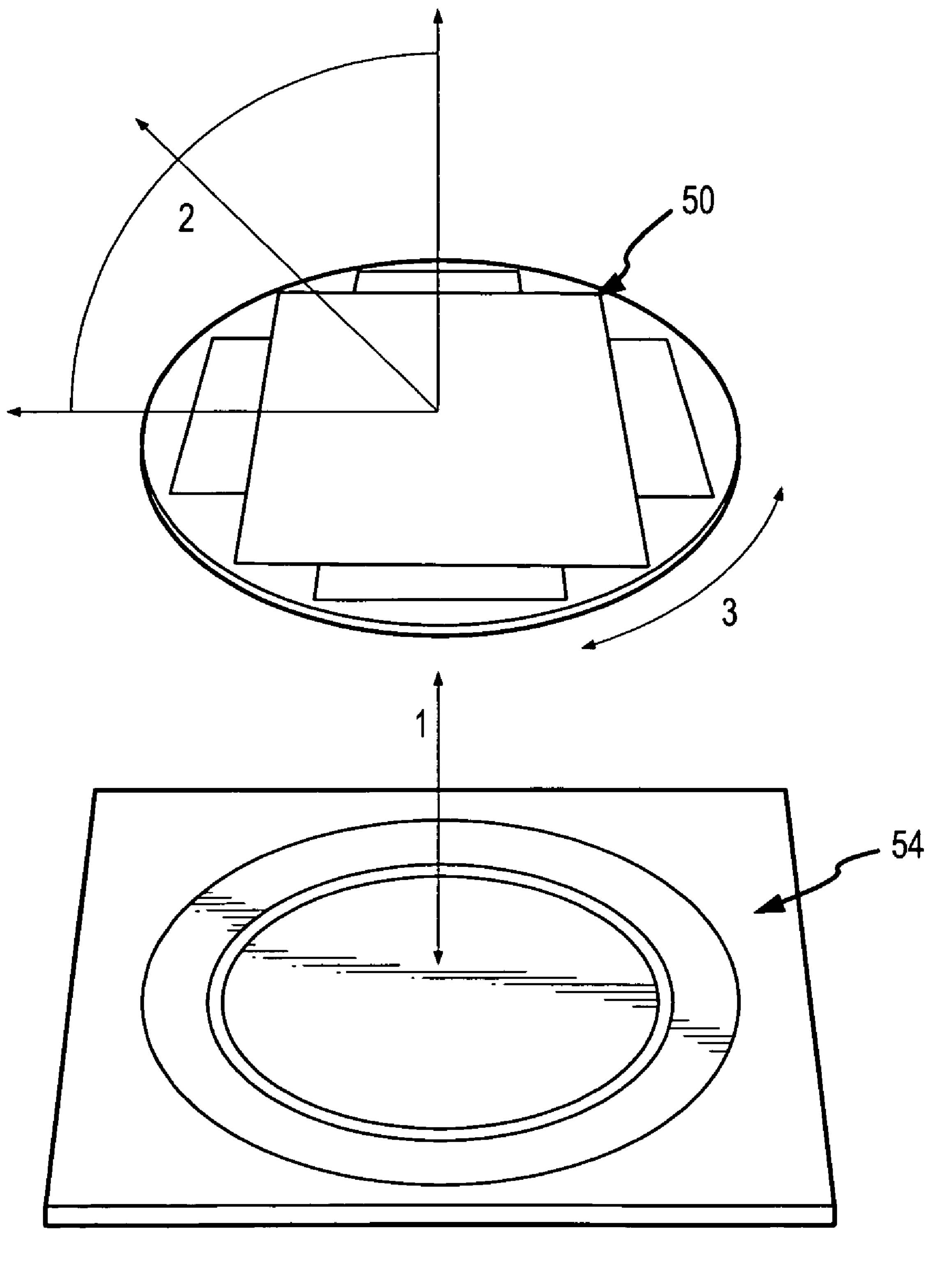
FIG. 3 illustrates a one-dimensionally electronically-pointable antenna mounted upon a motorized turntable.

FIGS. 1-3 illustrate the various embodiments of the system of the present invention. Referring to FIG. 1, the system 10 includes a Global Positioning System ("GPS") receiver 20 adapted to receive GPS satellite broadcasts enabling the receiver 20 to determine the approximate location of the system 10 or craft upon which the system 10 is mounted. In a preferred embodiment, the GPS receiver 20 is flush-mounted within the roof of a vehicle in which the system 10 is installed in order to enable clearest reception of the GPS satellite broadcast signals. The GPS receiver 20 is in data communication with a controller or processor 40 via a serial data cable or similar device in order to enable the controller 40 to receive such information and to determine or calculate look-angles to point the antenna at the desired direct broadcast satellite. Such GPS receivers are commercially available from various vendors.

In order to determine the three-dimensional orientation of the vehicle in which the system is installed, this embodiment of the present invention further includes an orientation system 30 for providing orientation data to the controller or processor 40, such orientation data being usable by the controller 40 to determine look-angles to point the antenna of the system (to be described in more detail herein below) at the desired satellite. Specifically, in one embodiment, the orientation system 30 comprises a solid-state electromagnetic field sensor and a fluid-filled tilt-sensor adapted to measure the three-dimensional orientation of the vehicle in which the system 10 is installed. In this embodiment, the solid-state electromagnetic field sensor and a fluid-filled tilt-sensor utilizes magnetometers and a fluid-filled tilt-sensor to establish absolute compass and tilt orientation of the system 10 without the use of gyroscopes. Such sensors perform minute measurements of the Earth's magnetic field, and use calibration software and the fluid-filled tilt sensor to overcome errors. This electronic compass and tilt-sensor mechanism has no moving parts other than the fluid-filled device, which does not suffer from the reliability difficulties of gyroscopes or other devices, which may require mechanical bearings. While the tilt-sensor device can be affected by lateral acceleration forces to cause inaccurate readings, the tilt-sensor device allows for accurate position tracking during any period of vehicle movement without heavy acceleration. This allows the antenna of the system 10 to be pointed accurately during most vehicle operations. But in the event the system includes a closed-loop fine-tuning mechanism, the signal from the direct broadcast satellite will be signal-locked while the vehicle moves without accelerating, and then a fine-tuning mechanism (to be described in more detail herein below in relation to FIG. 2), will hold the lock regardless of any acceleration forces. In the event the system does not include fine-tuning mechanism, a controller 40 (to be described in more detail herein below) may be adapted to determine the correct vehicle position by using time-differentiation of the compass orientation to determine the amount at which to compensate for tilt-sensor errors due to lateral acceleration, by methods known in the art. The orientation system comprising an electronic compass and tilt-sensor are available from a variety of commercial vendors, such as Precision Navigation Inc., and the three-dimensional position data may be communicated to the controller 40 via a digital or analog output, such as an EIA/TIA-232 serial link.

As noted in FIG. 1, the system 10 further includes the controller 40, which is adapted to receive the location data from the GPS receiver 20 and the three-dimensional orientation data from the orientation system 30. The controller 40 is also adapted to receive from a first user a first input corresponding to a first desired direct broadcast satellite. Pre-cached information or information from the GPS receiver 20 is also utilized by the controller 40 to determine true north orientation of the system 10 from the GPS location data and the magnetic position of the compass of the orientation system 30 of the present invention. In this regard, the controller is adapted to utilize this information and to perform any coordinate conversions as necessary to compute look-angles relative to the vehicle with which the system 10 is mounted, based upon the user-selected direct broadcast satellite, current location and orientation of the vehicle. The controller 40 is adapted to determine position control inputs or data based upon the computed look-angle, and transmits such position control data to the antenna 50. In the event there is no closed-loop fine-tuning circuit, such position control data is transmitted to the antenna 50 continuously. Otherwise, if the system 10 includes a closed-loop fine-tuning circuit, the position control data is sent to the antenna 50 by the controller 40 during absences of signal lock, as determined by the state of a signal lock detector which controls the activation/deactivation of the closed-loop fine-tuning circuit. Such signal lock detectors and closed-loop fine-tuning circuits are commercially available. Position control of the antenna 50 comes from the controller 40 during initial acquisition or lost signal. The Antenna 50 is otherwise controlled by the closed-loop fine-tuning circuit which continuously adjusts position of antenna 50.

In one embodiment, the controller 40 includes a personal computer, such as an Embedded Windows NT or Windows CE computer, with PCMCIA input/output cards to exchange data with the other system elements (e.g., receiver 20, orientation system 30, antenna 50). This will allow for simple and inexpensive modifications and upgrades to the system 10. It could also provide the cost/saving benefits of a built-in television and multi-media display and web browsing capabilities to the occupants of the vehicle in which the system 10 is installed, without the need for external television monitors or web-browsing devices.

As noted above, the system 10 can be open-loop in nature in that the controller 40 can utilize data from the orientation system 30 and the GPS receiver 20 to calculate coarse look-angle for the antenna 50 in order to point it at all times. In another embodiment, illustrated in FIG. 2, the controller 40 includes a signal lock detector and closed-loop feedback control circuit 70, whereby once the antenna 50 is pointed by approximation (e.g., X-Y input positions) and the expected direct broadcast signal is detected on the antenna 50 by the signal lock detector, the closed-loop fine-tuning feedback circuit begins steering the antenna 50 and input from the controller 40 will not be needed until signal is lost again. Such loss of signal may be due to obstacles or unusual vehicle orientation. In this regard, the controller 40 is designed to steer the antenna 50 during these periods of initial signal acquisition or loss of signal. The antenna 50 can be steered to optimum reception during periods of satellite visibility, and held close to the optimum position during periods of occlusion, in order to minimize time to regain the best reception when the satellite becomes visible again. In these such cases, the antenna 50 acts as a "mono-pulse feed". By comparing how much the signal from the direct broadcast satellite is coming in to, for example, the left side of the antenna compared to the right side, with the top of the antenna compared to the bottom, the antenna 50 may be adapted to put out two or more "differential" outputs, to thereby point the antenna slightly left or slightly right, or slightly up or slightly down, depending on how the antenna 50 is configured. In this regard, the antenna 50 may be capable of very fine directional tuning in one or both dimensions (e.g., X-Y dimensions or Azimuth and Elevation dimensions). In the event the antenna 50 is capable fine position control in at least one dimension, the overall cost of the system 10 may be reduced by including the closed-loop fine-tuning circuit 80, so that less precise and less expensive GPS and orientation system elements may be used, and less computing power may be required of the controller 40.

Referring to FIG. 1, and as noted herein above, the system 10 includes an electronically-pointable antenna 50 capable of being installed on the roof of a car, truck, boat, airplane or other mobile craft with little or no adverse affect on vehicle aerodynamics. As opposed to a reflecting parabolic dish, which must be physically pointed at the desired satellite, the antenna 50 of the system 10 of the present invention is electronically-pointable. In one embodiment, the antenna 50 has a substantially flat physical profile and comprises, for example, a small phased array or plasma grating antenna capable of position scanning in two dimensions. Position scanning in two dimensions refers to the capability of such antennas to change their internal electronic configuration is such a way as to enable such antenna to selectively receive the signal from a particular direction, selectable along two orthogonal axes. This direction is referred to as the direction in which the antenna is "pointed", even though the antenna 50 may not physically move at all, hence the term "electronically-pointable". In one embodiment, the antenna 50 comprises a phased array antenna, such as those currently available from Harris Corp. and the Boeing Corp. In another embodiment, the antenna 50 comprises a scanning array available from ThermoTrex Corporation or a plasma grating antenna commercially available from WaveBand Corporation. In the event such antennas 50 are capable of electronically pointing only in one dimension, in order to achieve two-dimensional pointing, the antenna 50 may be mounted on a flat motorized turntable 54 such as illustrated in FIG. 3. Electronic pointing in a single dimension may be continuously adjustable or discreetly adjustable. For example, antennas such as an older phased array system and the antennas built by ThermoTrex Corporation, such as a scanning array, can generally be adjusted to point in a continuum of positions along an axis, and these antennas can be continuously fine-tuned using a feedback loop control circuit illustrated in FIG. 2 for an exact direction along the axis. Conversely, plasma grating antennas, such as those available from WaveBand Corporation, must point in one of a fixed number of directions along an axis. These antennas must continuously be set for the best approximation of the desired pointing direction.

As indicated above, and referring to FIG. 3, a one-dimensionally electronically-pointable antenna 50 may be mounted on a motorized turntable 54 in order to give it two-dimensional pointing capability. The orientation of the turntable 54 can be continuously variable and could be kept pointed at the correct relative Azimuth of the desired direct broadcast satellite with an electronic feedback loop, while the antenna 50 mounted on the turntable 54 would be adjusted for the correct relative elevation. In an alternative embodiment, the antenna 50 comprises an electronically-pointable antenna adapted to be pointed along both axes or dimensions. For example, the relative Azimuth and Elevation (i.e., spherical coordinates) of the desired direct broadcast satellite can be converted in to X-Y directions (i.e., Cartesian coordinates) and the antenna 50 would be pointed along X and Y axes relative to the orientation of the vehicle in which the system antenna is mounted.

As noted above, the antenna 50 is adapted to receive position control data or look-angles from the controller 40 which dictate the direction in which the antenna 50 is to point in two-dimensions. As such, once the antenna 50 is pointed at the desired broadcast satellite, a direct broadcast satellite radios signal may enter the antenna 50. Direct broadcast radios signals may be received into the aperture of the antenna 50 and transmitted to a direct broadcast satellite receiver 60 of the system 10. This may occur jafter filtering and down-conversion to a lower frequency. In one embodiment, the antenna 50 has a single radio frequency output, with polarization determined by a polarization input designed to select the appropriate polarization to match a particular incoming direct broadcast signal. For example, a direct broadcast satellite receiver may switch the polarization of the antenna 50 between right-hand circular and left-hand circular polarization in order to change between two adjacent digital television channels on a typical direct broadcast satellite system. Other antennas 50 may have an independent radio frequency output for each desired signal polarization. In either case, this output is receivable by the receiver 60. This output may also be fed to a circuit controller 40 in order to determine the strength of the incoming direct broadcast signal, for determining presence or absence of a signal lock. In this embodiment, the antenna 50 includes signal outputs in addition to a primary radio frequency output, which provides relative directional signal strength of the incoming signal from the direct broadcast satellite in order to track the satellite position using a closed-loop feedback control circuit 80, substantially as described herein above in relation to FIG. 2.

As noted above, the system 10 further includes a direct broadcast system receiver 60, commonly known as a set-top box or a satellite modem for data service or a functional equivalent of one or both of these. Such receivers 60 are available from various vendors. Receiver 60 may comprise, for example, one television and one data receiver, each using output from the antenna 50. The main input to the receiver 60 is the radio frequency output of the antenna 50. This input to the receiver 60 may be via a single cable with a separately selected signal polarization or multiple cables with different polarizations. Output from the receiver 60 is audio and video signals to a television, CRT or other audio/video electronics or a data connection (e.g., Ethernet) to a computer in the case of a satellite modem-type receiver. Alternatively, the satellite modem may be installed directly into a personal computer or similar computer. Either television or data from the receiver 60 can be displayed on the computer component of the controller 60, as noted herein above to save costs, or to a separate display unit.

The foregoing description of the invention has been presented for purposes of illustration and description. Furthermore, the description is not intended to limit the invention to the form disclosed herein. Consequently, variations and modifications consistent with the above teachings and with the skill or knowledge of the relevant art are within the scope of the present invention. The embodiments described hereinabove are further intended to explain the best modes known for practicing the invention and to enable other skilled in the art to utilize the invention in such, or, other embodiments and with various modifications required by the particular applications or uses of the present invention. It is intended that the appended claims should be construed to include alternative embodiments to the extent permitted by the prior art.

The invention claimed is:

1. A system for receiving broadcast satellite transmissions in one of an air-based, a land-based, and a sea-based vehicle, said system comprising:

- an orientation system for determining at least a first orientation of the vehicle in three dimensions;
- a controller in communication with said orientation system, said controller adapted to receive first orientation data corresponding to said first orientation of the vehicle and to receive first location data corresponding to a first location of the vehicle relative to a predetermined positioning system, wherein said controller utilizes said first orientation data and said first location data to determine first position control data;
- a one dimensionally electronically-pointable antenna mounted upon a motorized turntable to provide two-dimensional pointing and adapted to receive said first position control data from said controller, wherein said motorized turntable is substantially flat and said one dimensionally electronically-pointable antenna is conformally mounted to said motorized turntable, wherein said motorized turntable is operable to be conformally mounted to a substantially flat surface of said vehicle, wherein said one-dimensionally electronically-pointable antenna is pointable in two-dimensions in open-loop operation in accordance with said first position control data to receive a first direct broadcast satellite signal from a first satellite having a known location relative to said predetermined positioning system;

a direct broadcast satellite receiver adapted to process a first radio frequency signal corresponding to said first direct broadcast satellite signal received by said electronically-pointable antenna to produce at least one of the first audio output, a first video output, and a first data output;

a closed-loop feedback system adapted to provide at least one output signal wherein said one dimensionally electronically pointable antenna is pointable in two-dimensions utilizing said at least one output signal in closed-loop operation to receive said first direct broadcast satellite signal; and, a signal lock for automatically activating and deactivating said closed-loop feedback system in response to said first direct broadcast satellite signal received by said one dimensionally electronically-pointable antenna, wherein said system is in open-loop operation when said closed-loop feedback system is deactivated and in closed-loop operation when said closed-loop feedback system is activated.

2. A system, as claimed in claim 1, wherein said at least one output signal controls a rotational orientation of said one-dimensionally electronically-pointable antenna on said turntable.

3. A system, as claimed in claim 1, wherein said one dimensionally electronically-pointable antenna comprises one of a phased array antenna and a plasma grating antenna.

4. A system, as claimed in claim 1, wherein said one dimensionally electronically-pointable antenna is substantially flat within a plane and is adapted to electronically point at a look-angle relative to said plane.

5. A direct broadcast satellite system, as claimed in claim 1, wherein said orientation system comprises a first electronic compass and tilt-sensor.

6. A direct broadcast satellite system, as claimed in claim 1, wherein said orientation system comprises a first solid-state electromagnetic field sensor and a first fluid-field tilt-sensor adapted to provide said first orientation data of the vehicle.

7. A direct broadcast satellite system, as claimed in claim 1, wherein said controller comprises an open-loop control system adapted to process said first location data, said first location data received from a Global Positioning System receiver in communication with said controller, said first orientation data from said controller, and position and signal characteristic data corresponding to a first satellite to determine said first position control data comprising at least a first coarse look-angle position data to point said one dimensionally electronically-pointable antenna.

8. A direct broadcast satellite system, as claimed in claim 7, wherein said signal lock detector is adapted for at least detecting a first loss of said first direct broadcast satellite signal to activate said open-loop operation.

9. A direct broadcast satellite system, as claimed in claim 8, wherein said closed-loop feedback system is adapted for controlling a rotational orientation of said turntable and a look-angle of said electronically-pointable antenna.

10. A system for receiving satellite transmissions in a vehicle, said system comprising:

a one dimensionally electronically-pointable antenna mounted to a motorized turntable to provide two-dimensional pointing, wherein said one dimensionally electronically-pointable antenna mounted upon said motorized turntable is substantially flat and operable to be conformally mounted to a surface of said vehicle;

an open-loop control system adapted to point said electronically-pointable antenna at a satellite, wherein said open-loop control system processes orientation data relative to a predetermined positioning system of a vehicle provided by a vehicle orientation determination system, wherein said open-loop control system processes location data relative to said predetermined positioning system of said vehicle provided by a vehicle location determination system, wherein said open-loop control system processes satellite position data for said satellite relative to said predetermined positioning system based on position data of said satellite stored in a first memory, wherein said open-loop control system is adapted for controlling a rotational orientation of said turntable and a look-angle of said electronically-pointable antenna based on said processing of vehicle orientation, vehicle location, and satellite position data;

a closed-loop control system adapted to point said electronically-pointable antenna at said satellite, wherein said closed-loop control system is adapted for controlling a rotational orientation of said turntable and a look-angle of said electronically-pointable antenna based on a first received satellite signal characteristic, and wherein said first received satellite signal characteristic is signal strength;

a signal lock for automatically switching between said open-loop and closed-loop control systems in response to said first received satellite signal characteristic; and a direct broadcast receiver for processing a signal from said satellite to produce at least one of the first audio output, a first video output, and a first data output.

11. A system for receiving satellite transmissions in a vehicle as claimed in claim 10, wherein said vehicle orientation determination system comprises an electronic compass and tilt sensor adapted to provide said orientation data.

12. A system for receiving satellite transmissions in a vehicle as claimed in claim 10, wherein said vehicle orientation determination system comprises a solid-state electromagnetic field sensor and a fluid-filled tilt-sensor adapted to provide said orientation data.

13. A system for receiving satellite transmissions in a vehicle as claimed in claim 10, wherein said vehicle location determination system comprises a Global Positioning System receiver to provide said location data.

14. A system for receiving satellite transmissions in a vehicle as claimed in claim 10, wherein said closed-loop control system is capable of controlling said rotational orientation of said turntable and said look-angle of said electronically-pointable antenna simultaneously.

15. A system for receiving satellite transmissions in a vehicle as claimed in claim 10, wherein said open-loop control system is capable of controlling said rotational orientation of said turntable and said look-angle of said electronically-pointable antenna simultaneously.

* * * * *

UNITED STATES PATENT AND TRADEMARK OFFICE

CERTIFICATE OF CORRECTION

PATENT NO. : 7,472,409 B1
APPLICATION NO. : 09/679590
DATED : December 30, 2008
INVENTOR(S) : Linton It is certified that error appears in the above-identified patent and that said Letters Patent is hereby corrected as shown below:

Column 5, line 66, delete "jafter" and insert therefor --after--.

Signed and Sealed this

Third Day of March, 2009

JOHN DOLL
*Acting Director of the United States Patent and Trademark Office*